(12) United States Patent
Kim et al.

(10) Patent No.: US 8,854,959 B2
(45) Date of Patent: Oct. 7, 2014

(54) COMMUNICATION APPARATUS USING SUPER FRAME TO RECONFIGURE DYNAMIC PROTOCOL, AND SENSOR NODE AND HUB DEVICE TO RECONFIGURE DYNAMIC PROTOCOL

(71) Applicants: Tae Seok Kim, Hwaseong-si (KR); Tae Rim Park, Seoul (KR)

(72) Inventors: Tae Seok Kim, Hwaseong-si (KR); Tae Rim Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 65 days.

(21) Appl. No.: 13/736,124

(22) Filed: Jan. 8, 2013

(65) Prior Publication Data

US 2013/0182718 A1    Jul. 18, 2013

(30) Foreign Application Priority Data

Jan. 16, 2012  (KR) ........................ 10-2012-0004686

(51) Int. Cl.
| | |
|---|---|
| *H04L 12/26* | (2006.01) |
| *H04W 4/00* | (2009.01) |
| *H04J 3/00* | (2006.01) |
| *H04J 3/16* | (2006.01) |
| *G06F 15/16* | (2006.01) |
| *H04L 12/911* | (2013.01) |
| *H04L 29/06* | (2006.01) |
| *H04W 48/00* | (2009.01) |
| *H04W 80/02* | (2009.01) |
| *H04W 74/00* | (2009.01) |
| *H04W 84/18* | (2009.01) |

(52) U.S. Cl.
CPC ............... H04L 69/08 (2013.01); *H04W 80/02* (2013.01); *H04W 4/006* (2013.01); H04L 47/70 (2013.01); H04W 48/00 (2013.01); *H04W 74/00* (2013.01); *H04W 84/18* (2013.01)
USPC ........... 370/229; 370/328; 370/345; 370/467; 709/227

(58) Field of Classification Search
CPC . H04W 28/12; H04W 48/00; H04W 52/0206; H04W 56/001; H04W 74/00; H04W 74/04; H04W 74/0808; H04W 76/00; H04W 76/02; H04W 80/00; H04W 84/12; H04W 88/08; H04W 92/10
USPC ......... 370/229–238, 310–350, 431, 436–437, 370/445–447, 464–469; 709/220–229, 709/230–236
See application file for complete search history.

(56) References Cited

U.S. PATENT DOCUMENTS

| | | | |
|---|---|---|---|
| 8,189,474 B2 * | 5/2012 | Venkataraman et al. | 370/235 |
| 8,254,345 B2 * | 8/2012 | Cho et al. | 370/337 |
| 2010/0260085 A1 | 10/2010 | Wang et al. | |
| 2010/0278062 A1 * | 11/2010 | Abraham et al. | 370/252 |
| 2011/0032912 A1 | 2/2011 | Cordeiro et al. | |
| 2013/0091292 A1 * | 4/2013 | Kim et al. | 709/230 |
| 2013/0182637 A1 * | 7/2013 | Joo | 370/315 |
| 2013/0230035 A1 * | 9/2013 | Grandhi et al. | 370/338 |

FOREIGN PATENT DOCUMENTS

| | | |
|---|---|---|
| KR | 10-2010-0096993 A | 9/2010 |
| KR | 10-2011-0076259 A | 7/2011 |

* cited by examiner

*Primary Examiner* — Tri H Phan
(74) *Attorney, Agent, or Firm* — NSIP Law

(57) ABSTRACT

Provided is a super frame that may be used to reconfigure a dynamic protocol to synchronize a sensor node with different protocols of a hub device. The super frame enables a hub device to provide a real-time quality of service (QoS) with respect to a plurality of sensor application programs.

22 Claims, 12 Drawing Sheets

FIG. 7

| TYPE OF CONTROL MESSAGE | PAYLOAD |
|---|---|
| CONFIGURE RESPONSE | [WHETHER TO ACCEPT CONFIGURE REQUEST] |

| TYPE OF CONTROL MESSAGE | PAYLOAD |
|---|---|
| NOTIFICATION | [WHETHER TO ACCEPT JOIN RESPONSE] |

810 … 830

COMMUNICATION APPARATUS USING SUPER FRAME TO RECONFIGURE DYNAMIC PROTOCOL, AND SENSOR NODE AND HUB DEVICE TO RECONFIGURE DYNAMIC PROTOCOL

CROSS-REFERENCE TO RELATED APPLICATION(S)

This application claims the benefit under 35 USC §119(a) of Korean Patent Application No. 10-2012-0004686, filed on Jan. 16, 2012, in the Korean Intellectual Property Office, the entire disclosure of which is incorporated herein by reference for all purposes.

BACKGROUND

1. Field

The following description relates to a communication apparatus that uses a super frame to reconfigure a dynamic protocol, and a method of a sensor node and a hub device to reconfigure the dynamic protocol.

2. Description of Related Art

Due to the distribution of portable personal digital devices and sensors, for example, smart phones and the like, various application programs using wireless communication have increased. The application programs may have a different quality of service (QoS) for each service field. An example of a service field is a wearable body area network (WAN) for use in health care. For example, a health care program such as electrocardiography (ECG), electroencephalography (EEG), electromyography (EMG), and the like, may have various requirements, for example, latency, reliability such as a packet error rate (PER), battery, and the like.

The number of sensors used by a personal digital device may vary in real time based on an application program that is executed in the personal digital device. Accordingly, there is a desire for a method that may support an optimal protocol in real time so that a hub device may provide a QoS that is required by sensor nodes connected to the hub device, other digital devices, and application programs.

SUMMARY

In an aspect, there is provided a communication system using a super frame to reconfigure a dynamic protocol in a network comprising at least one sensor node and a hub device, the communication system including the at least one sensor node and the hub device that communicate via the super frame, wherein the super frame comprises a beacon period in which a beacon message is transferred to the at least one sensor node, the beacon message comprising information about an access period protocol to be used during an access period and information about a media access control (MAC) protocol to be used during a MAC period, the access period in which the at least one sensor node requests access to the hub device based on the access period protocol, and the at least one MAC period in which data is received from the at least one sensor node or is transmitted to the at least one sensor node based on the MAC protocol.

The super frame may further comprise a sleep period during which the at least one sensor node and the hub device suspend communication.

The at least one MAC period may comprise a plurality of MAC periods that are individually assigned to each of a plurality of sensor nodes, respectively.

The information about the access period protocol may comprise at least one of a field indicating an identifier (ID) of the access period protocol, a field indicating a length of the access period, and a field indicating a common parameter value of the access period protocol.

The information about the MAC protocol may comprise at least one of a field indicating the number of MAC protocols used in the at least one MAC period, a field indicating an ID of each MAC protocol used in the at least one MAC period, a field in which an amount of time used by each MAC period is sequentially sorted, and a field indicating information about common parameters used by the at least one MAC protocol.

The beacon message may further comprise a field indicating whether the hub device supports a reconfigure function of the dynamic protocol and a field indicating whether the hub device comprises a function of transferring a component request of the at least one sensor node to an external device.

The at least one sensor node and the hub device may exchange a control message to reconfigure the dynamic protocol during the access period, and the control message may comprise a type field indicating a type of the control message and a payload field corresponding to the type of the control message.

The control message may be a join request message used when the at least one sensor node requests access to the hub device, and the payload field of the join request message comprises at least one of information indicating whether the at least one sensor node supports a reconfigure function of the dynamic protocol, information about an ID of each of at least one MAC protocol maintained by the at least one sensor node for reconfiguration of the dynamic protocol, and information about a quality of service (QoS) requirement of an application program requiring reconfiguration of the protocol.

The control message may be a join response message informing the at least one sensor node about a determination of the hub device with respect to a join request message, and the payload field of the join response message comprises at least one of information indicating whether to allow the at least one sensor node to access the hub device, information about an ID of a MAC protocol used when the access is allowed, and information about a parameter setting value of the MAC protocol.

The control message may be a configure request message informing the at least one sensor node about a change in operation information, and the payload field of the configure request message comprises at least one of information indicating whether to maintain access to the hub device, information associated with an ID of a MAC protocol used if the current access is maintained, and information associated with a parameter setting value of the MAC protocol.

The control message may be a component request message requesting a component to be used to reconfigure the dynamic protocol, and the payload field of the component request message comprises at least one of information associated with an ID of a MAC protocol used by the at least one sensor node or the hub device, and information associated with an ID of a MAC protocol maintained by the at least one sensor node or the hub device.

The control message may be a component delivery message comprising information about a component used to reconfigure the dynamic protocol, and a payload field of the component delivery message comprises at least one of information associated with the component and pending data information indicating whether subsequent information is present.

In an aspect, there is provided a method of a sensor node to reconfigure a dynamic protocol in a network comprising at least one sensor node and at least one hub device, the method including receiving a beacon message comprising information about an access period protocol to be used during an access period and information about a media access control (MAC) protocol to be used during a MAC period, transmitting a join request message to a hub device based on the access period protocol, the join request message comprising a request by the at least one sensor node to access the hub device, receiving a join response message indicating whether the hub device accepts the join request message, and receiving or transmitting data according to the MAC protocol, in response to the hub device allowing the at least one sensor node to have access.

The method may further comprise determining whether the sensor node maintains the MAC protocol based on the join response message.

The method may further comprise transmitting, to the hub device, a message requesting a component used to configure the MAC protocol.

The method may further comprise transmitting a notification message indicating whether the sensor node accepts the join response message using the access period protocol, in response to receiving the join response message from the hub device.

In an aspect, there is provided a method of a hub device to reconfigure a dynamic protocol in a network comprising at least one sensor node and a hub device, the method including transmitting, to the at least one sensor node, a beacon message comprising information about an access period protocol to be used during an access period and information about a media access control (MAC) protocol to be used during a MAC period, receiving a join request message based on the access period protocol from the at least one sensor node, the join request message comprising a request for the at least one sensor node to access the hub device, transmitting a join response message to the at least one sensor node based on the access period protocol, the join response message indicating whether the join request message is accepted, and receiving or transmitting data according to the MAC protocol, in response to the hub device allowing the at least one sensor node to access the hub device.

The method may further comprise determining whether the at least one sensor node maintains a protocol reconfigure function based on the join request message, and determining operation information based on information included in the join request message, based on the determination result.

The method may further comprise transmitting, to the at least one sensor node, a configure request message informing of a change of the MAC protocol and an operation parameter.

The method may further comprise receiving, from the at least one sensor node, a message requesting a component used by the at least one hub device to configure the MAC protocol, and transmitting a component request message to an external apparatus depending on whether the component is included.

The method may further comprise transmitting, to the at least one sensor node, a component delivery message comprising information associated with the component.

The method may further comprise receiving a notification message indicating whether the at least one sensor node accepts the join response message, using the access period protocol.

Other features and aspects will be apparent from the following detailed description, the drawings, and the claims.

BRIEF DESCRIPTION OF THE DRAWINGS

FIG. 7 is a diagram illustrating an example of a configure response message.

FIG. 8 is a diagram illustrating an example of a notification message.

Figure 1:
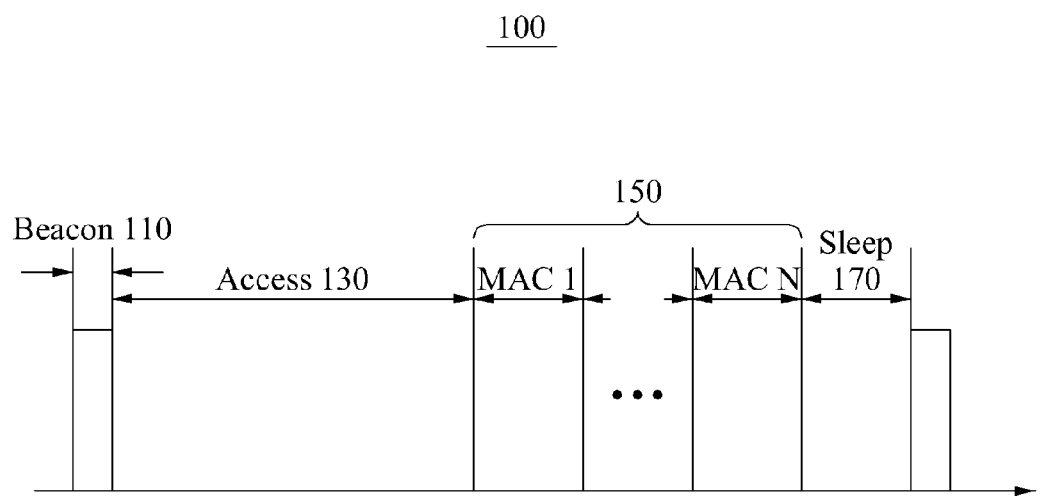
FIG. 1 is a diagram illustrating an example of a media access control (MAC) protocol in a super frame structure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity and conciseness.

FIG. 1 illustrates an example of a media access control (MAC) protocol in a super frame structure.

In a network including at least one sensor node and at least one hub device, the super frame may be used by a communication apparatus to reconfigure a dynamic protocol. The communication apparatus may be understood as a concept that includes the at least one sensor node and the at least one hub device. For example, the communication apparatus may correspond to the hub device. As another example, the communication apparatus may correspond to the sensor device. The at least one hub device and the at least one sensor may constitute a system. The at least one hub device and the at least one sensor may communicate via a network such as a wireless communications network.

In the following, the term "hub device" may refer to a portable terminal device, for example, a smart phone, a computer, a tablet, an appliance, and the like. The term "sensor node" may refer to a sensor or another digital device.

Referring to FIG. 1, a super frame 100 includes a beacon period 110, an access period 130, at least one MAC period 150, and a sleep period 170. A format of the super frame structure may be determined by a hub device.

For example, a size of the super frame 100 may be limited based on information included in the beacon period 110. In the network, a hub device may transmit a beacon during the beacon period 110 corresponding to a first slot of the super frame 100. The beacon period 110 may be used to match synchronization protocols of a sensor node that is connected to the hub device. The beacon period 110 may be used to transfer, to the sensor node, information about a super frame structure set by the hub device.

During the beacon period 110, a hub device may transfer a beacon message to at least one sensor node. For example, the beacon message may include information about an access period protocol used in the access period 130 by the at least one sensor node and information about a MAC protocol used in a corresponding MAC period by each of the at least one sensor nodes. An example of the beacon message is described with reference to FIG. 2.

During the access period 130, a sensor node may attempt to access the hub device based on the access period protocol. For example, during 130, a sensor node having a message to transfer to the hub device may attempt to access the hub device.

During the access period 130, the sensor node may request access to the hub device using a join request message. As another example, a component request message may be used when the sensor node requests a protocol component used for the access, and the like. During the access period 130, the hub device may transfer a control message to the sensor node that attempts to access the hub device or that is connected to the hub device. An example format of the control message, a type of the control message, and the like, are described with reference to FIG. 3 through FIG. 10.

The access period protocol used during the access period 130 may be determined by a hub device. The access period protocol determined by the hub device may be stored in the beacon period 110 and may be transferred to at least one sensor. For example, the access period protocol may be a protocol based on a carrier sense multiple join (CSMA) contention.

During the at least one MAC period 150, data may be received from one or more sensor nodes, or may be transmitted to one or more sensor nodes based on a MAC protocol corresponding to the corresponding MAC period 150. For example, data may be transmitted and received between the at least one sensor node and the hub device. By employing a plurality of MAC periods, for example, MAC1, MAC2, ..., MAC N, the hub device may employ a different MAC protocol for each MAC period. Each sensor node may be assigned a MAC period based on determination of the at least one hub device. For example, a plurality of MAC periods 150 may be individually assigned to a plurality of sensor nodes, respectively.

During the sleep period 170, the sensor node and the hub device may suspend communication and may maintain sleep mode. For example, during the sleep period 170, a sensor node and the hub device may turn off a communication module and enter into the sleep mode for power saving. The sleep period 170 may be selective.

Figure 2:
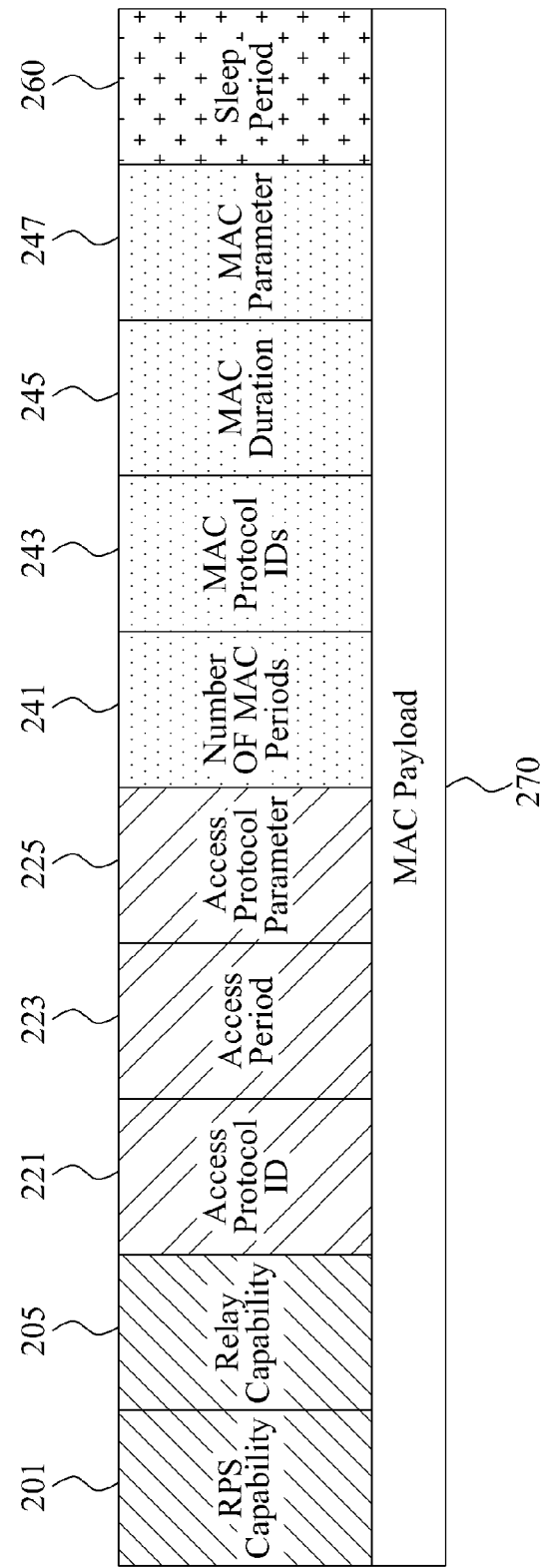
FIG. 2 is a diagram illustrating an example of fields constituting a beacon message.

FIG. 2 illustrates an example of fields constituting a beacon message. The beacon message may be transferred during the beacon period 110 of FIG. 1.

For example, the beacon message may include a reconstructible protocol system (RPS) capability field 201 that indicates whether at least one hub device supports a dynamic protocol reconfigure function.

A relay capability field 205 may indicate whether the at least one hub device has a function for relaying a component request of a sensor node. For example, a sensor node may transmit a component request, however, a hub device may not have a corresponding component. In this example, if the hub device is capable of transferring the request for the corresponding component to an external apparatus, the hub device may set the relay capability field 205 to, for example, "1". In the alternative, if the hub device is incapable of transferring the request to the external apparatus, the hub device may set the relay capability field 205 to, for example, "0".

The beacon message may include fields associated with an access period protocol.

For example, an access protocol identifier (ID) field 221 may indicate an ID of a protocol such as an access period protocol used in the access period 130. The beacon message may include an access period field 223 that indicates a length of the access period 130, and an access protocol parameter field 225 that indicates a common parameter value of the access period protocol.

The beacon message may include fields that contain information associated with a MAC protocol. For example, a number of MAC periods field 241 may indicate the number of MAC protocols used in the at least one MAC period 150. A MAC protocol IDs field 243 may indicate an ID of each of at least one MAC protocol used in the at least one MAC period 150. For example, the at least one ID may be sorted in a time order in which the at least one MAC protocol is used. An amount of time used by each of the at least one MAC period 150 may be sequentially sorted in a MAC duration field 245. A MAC parameter field 247 may indicate information associated with common parameters used by at least one MAC protocol in the at least one MAC period 150.

The beacon message may further include a sleep period field 260 indicating information about a length of the sleep period 170. In addition, the beacon message may include a MAC payload field 270.

Figure 3:
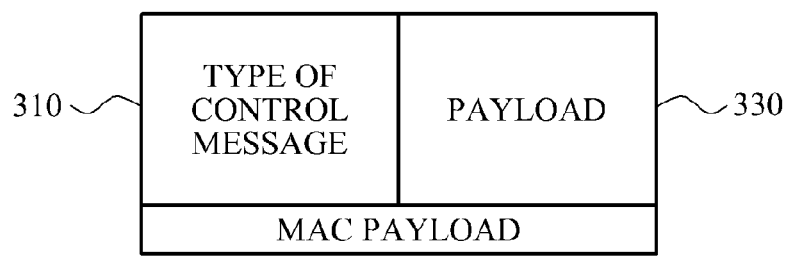
FIG. 3 is a diagram illustrating an example of a control message.

FIG. 3 illustrates an example format of a control message.

Communication apparatuses such as a sensor node and a hub device may exchange a control message 300 to reconfigure a dynamic protocol during the access period 130.

For example, the control message 300 may include a type field 310 indicating a type of the control message 300 and a payload field 330 corresponding to the type of the control message 300. The control message 300 may further include a MAC payload field. The type field 310 may indicate a corresponding type of the control message 300. A form of the payload field 330 may vary based on the type of the control message 300.

Example types of the control message 300 and a configuration of the payload field corresponding thereto are described with reference to FIG. 4 through FIG. 10.

Figure 4:
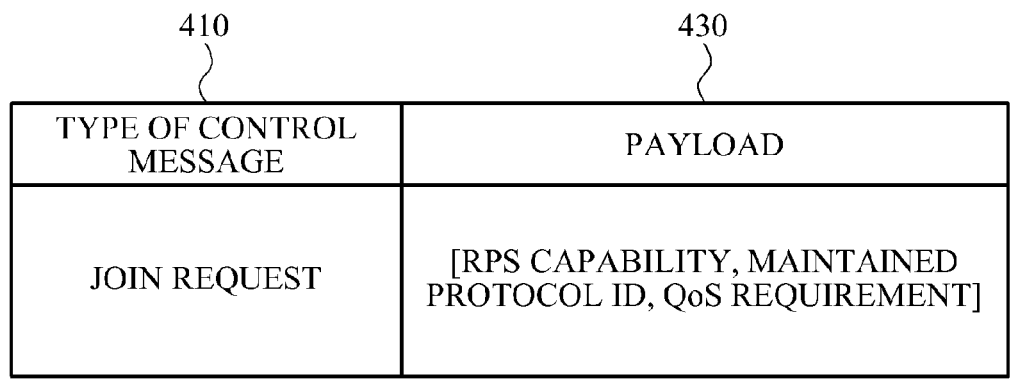
FIG. 4 is a diagram illustrating an example of a join request message.

FIG. 4 illustrates an example of a join request message.

Referring to FIG. 4, a type field 410 indicates that the type of the control message is a join request message. In this example, the join request message may be used when at least one sensor node requests a hub device for access.

For example, a payload field 430 of the join request message may include information indicating whether the at least one sensor node supports a reconfigure function of a dynamic protocol, for example, an RPS capability. The payload field 430 may include information associated with an ID of each of at least one MAC protocol maintained by the at least one sensor node for reconfiguration of the dynamic protocol. In addition, the payload field 430 may include information associated with a quality of service (QoS) requirement of an application program requiring reconfiguration of the protocol. Each sensor node may verify information associated with an access period using a beacon, which is transmitted from a hub device during a beacon period, and may transmit the join request message to the hub device during the corresponding access period.

Figure 5:
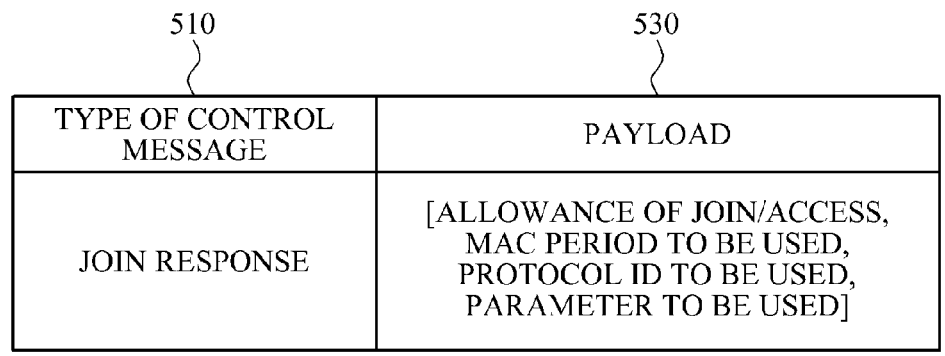
FIG. 5 is a diagram illustrating an example of a join response message.

FIG. 5 illustrates an example of a join response message.

Referring to FIG. 5, a type field 510 indicates that the type of control message is a join response message. The join response message may inform a sensor node about a determination of a hub device with respect to a join request message.

For example, a payload field 530 of the join response message may include information indicating whether the sensor node is allowed to access the hub device, information associated with an ID of a MAC protocol used when the access is allowed, and information associated with a parameter setting value of the MAC protocol.

Figure 6:
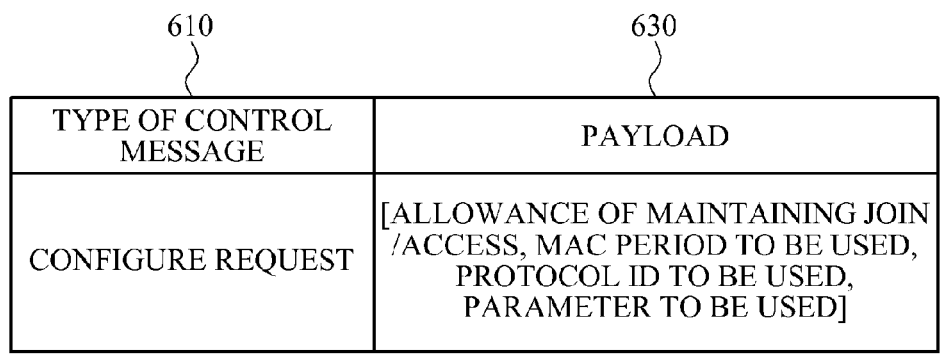
FIG. 6 is a diagram illustrating an example of a configure request message.

FIG. 6 illustrates an example of a configure request message.

Referring to FIG. 6, a type field 610 indicates that the type of control message is a configure request message. The configure request message may inform a sensor node, accessing a hub device, about a change in operation information.

For example, a payload field 630 of the configure request message may include information indicating whether the sensor node is to maintain a current access to the hub device, information associated with an ID of a MAC protocol used when the current access is maintained, and information associated with a parameter setting value of the MAC protocol.

FIG. 7 illustrates an example of a configure response message.

Referring to FIG. 7, a type field 710 indicates that the type of control message is a configure response message. The configure response message may transfer, to a hub device, information indicating whether a sensor node accepts a configure request message. For example, a payload 730 of the configure response message may indicate whether the sensor node accepts the configure request message.

FIG. 8 illustrates an example of a notification message.

Referring to FIG. 8, a type field 810 indicates that the type of control message is a notification. The notification message may transfer, to a hub device, information indicating whether a sensor node accepts a join response message. For example, a payload field 830 of the notification message may indicate whether the sensor node accepts the join response message.

Figure 9:
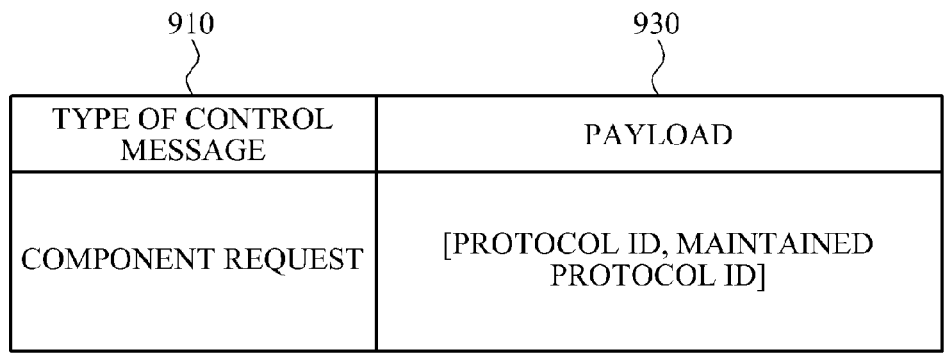
FIG. 9 is a diagram illustrating an example of a component request message.

FIG. 9 illustrates an example of a component request message.

Referring to FIG. 9, a type field 910 indicates that the type of control message is a component request message. The component request message may request a component used to reconfigure a dynamic protocol. For example, the component request message may be used when a protocol requested by a sensor node is not included in a protocol list of a hub device to which the sensor node has access to. For example, the hub device receiving the component request message may transmit the component request message to an external device, for example, a cloud computer or another hub device that includes the corresponding component.

For example, a payload field 930 of the component request message may include at least one of information associated with an ID of a MAC protocol used by the sensor node or the hub device and information associated with an ID of a MAC protocol maintained by the sensor node or the hub device.

Figure 10:
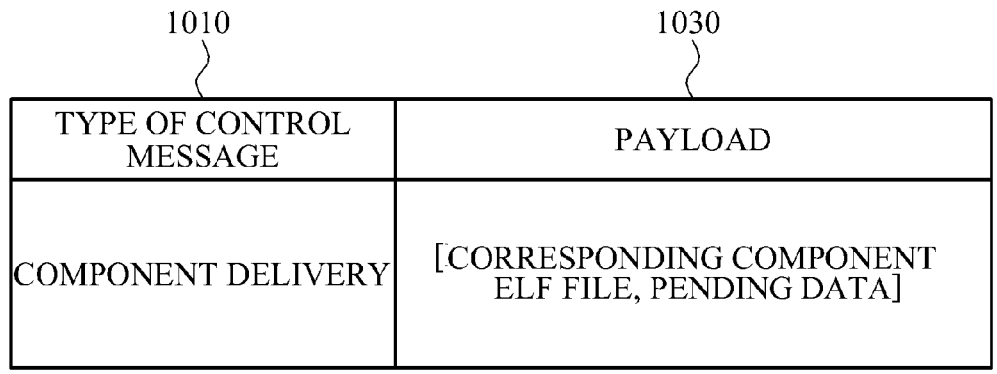
FIG. 10 is a diagram illustrating an example of a component delivery message.

FIG. 10 illustrates an example of a component delivery message.

Referring to FIG. 10, a type field 1010 indicates that the type of a control message is a component delivery message. A component delivery message may include information associated with a component used to reconfigure a dynamic protocol.

In response to a component request message from a sensor node, a payload field 1030 of the component delivery message may include at least one, for example, executable and linkable format (ELF) data, associated with the used component and pending data information indicating whether subsequent information of the information is present. In this example, the pending data information may be expressed as a parity bit.

Hereinafter, a message exchanging process for connection between a hub device and a sensor node in a super frame structure according to various aspects is described.

Figure 11:
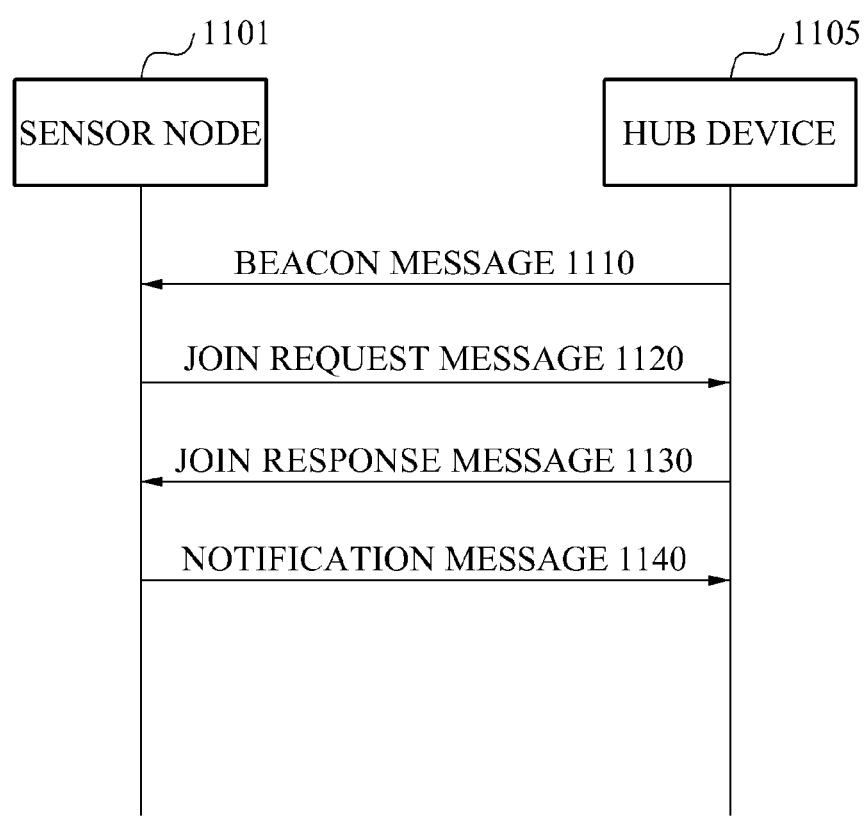
FIG. 11 is a flowchart illustrating an example of a join procedure between a hub device and a sensor node.

FIG. 11 illustrates an example of a join procedure between a hub device and a sensor node. FIG. 11 is an example of a message exchanging method of a sensor node in a network including at least one sensor node and hub device to reconfigure a dynamic protocol.

In 1110, a sensor node 1101 receives a beacon message from a hub device 1105. For example, the beacon message may include information associated with an access period protocol for an access period of the hub device 1105 and information associated with a MAC protocol for a MAC period to be used by the sensor node 1101 to access the hub device 1105.

In 1120, the sensor node 1101 receiving the beacon message transmits a join request message to the hub device 1105 based on the access period protocol that is set with respect to the corresponding access period. In this example, the hub device 1105 may determine whether the sensor node 1101 has a dynamic protocol reconfigure function, for example, an RPS capability, based on the join request message, and may determine operation information based on information that is included in the join request message.

For example, the hub device 1105 receiving the join request message may determine optimal operation information based on information that is included in the join request message and that is associated with a QoS requirement of an application program requiring reconfiguration of a protocol. In this example, the optimal operation information may include an optimal MAC protocol, a parameter setting value for the corresponding MAC protocol, and the like. In 1130, the hub device 1105 stores the optimal operation information in a join response message that includes information indicating whether to accept the join request message, and transmits the join response message to the sensor node 1101.

As an example, if the sensor node 1101 does not include a dynamic protocol reconfigure function, for example, an RPS capability, the hub device 1105 may inform the sensor node 1101 that the hub device 1105 does not accept the join request message using the join response message. As another example, the hub device 1105 may inform the sensor node 1101 that the hub device 1105 does accept the join request message.

In 1140, the sensor node 1101 transmits a notification message indicating whether the sensor node 1101 accepts the join response message, using the access period protocol. In this example, the hub device 1105 and the sensor node 1101 may exchange messages regardless of whether the sensor node 1101 includes the dynamic protocol reconfigure function. Next, the sensor node 1101 may transmit or receive data according to a MAC protocol, depending on whether the sensor node 1101 accepts the join response message.

Figure 12:
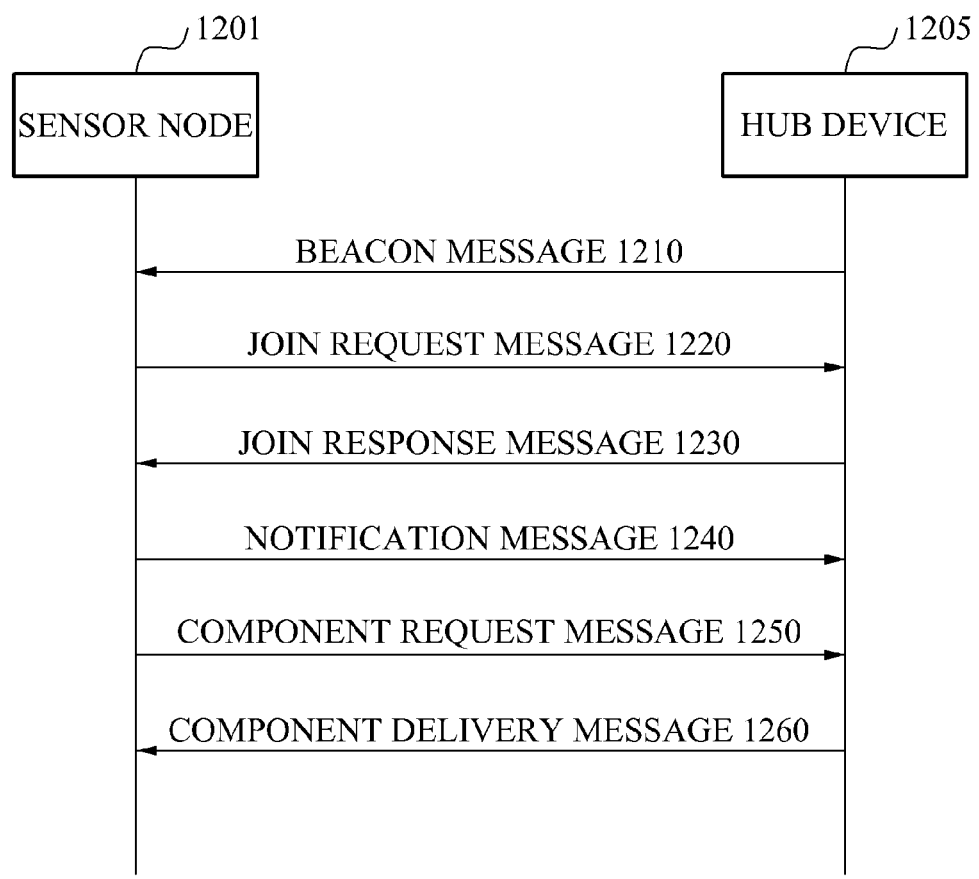
FIG. 12 is a flowchart illustrating an example in which a sensor node requests an additional component during a join procedure with a hub device.

FIG. 12 illustrates an example in which a sensor node requests an additional component during a join operation with a hub device. In this example, the hub device has a dynamic protocol reconfigure function.

Operations 1210 to 1240 of FIG. 12 are the same as operations 1110 to 1140 of FIG. 11 and thus, further detailed description is omitted here.

When a sensor node 1201 that does not maintain a MAC protocol attempts to access a hub device 1205, the sensor node 1201 may transfer acceptance of the join response message using a notification message of 1240.

In 1250, the sensor node 1201 transmits, to the hub device 1205, a message requesting a component used to reconfigure a MAC protocol used by the hub device 1205.

In 1260, the hub device 1205 verifies whether a corresponding component is maintained at the hub device 1205 and then transfers to the sensor node 1201 an ELF file of the corresponding component using a component delivery message. In various examples herein, if the hub device 1205 does not have the component, the hub device 1205 may request the component from an external device such as a cloud or another hub device.

Figure 13:
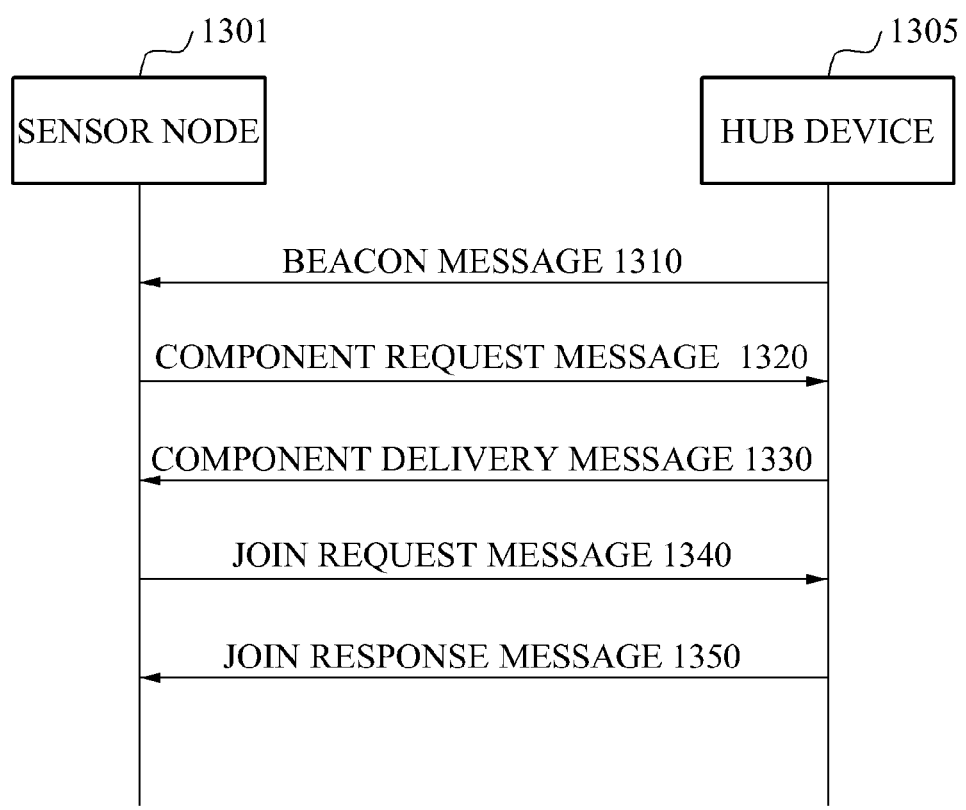
FIG. 13 is a flowchart illustrating an example in which a sensor node uses an additional component during a join procedure with a hub device.

FIG. 13 illustrates an example in which a sensor node uses an additional component during a join operation with a hub device. In this example, a hub device 1305 does not have a dynamic protocol reconfigure function requested by the sensor node, but has a relay function for relaying a request for a component of a protocol.

In 1310, a sensor node 1301 receives a beacon message from the hub device 1305 that the sensor node 1301 desires to access, and obtains information associated with an access period. For example, the beacon message may include information associated with an access period protocol used in the access period by the sensor node 1301 and information associated with a MAC protocol used in a MAC period by the sensor node 1301.

In 1320, because the sensor node 1301 does not maintain an operating protocol, for example, the MAC protocol used in the MAC period, the sensor node 1301 transmits a component request message to the hub device 1305. For example, the sensor node 1301 may determine whether the sensor node 1301 includes the MAC protocol used by the hub device 1305, and in response to determining that the sensor node does not have the MAC protocol, the sensor node may transmit the component request.

The hub device 1305 receiving the component request message may transmit the component request message to an external device, for example, a cloud computer or another hub device that includes the corresponding component. In this example the hub determines whether the corresponding component is stored at the hub device 1305. In response to determining that the hub device does not have the component, the hub may transmit the request to an external device. In 1330, the hub device 1305 transmits a component delivery message together with information indicating whether to accept the component request, based on whether the corresponding component is received. In 1340, the sensor node 1301 receiving the corresponding component transmits a join request message to request the hub device 1305 for access.

When the hub device 1305 allows the access of the sensor node 1301, the hub device 1305 transmits, to the sensor node 1301, a join response message indicating a parity associated with a join allowance in a payload portion in 1350.

As another example, if the sensor node 1301 does not include the operation protocol verified from the beacon message, the sensor node 1301 may directly transmit the join request message to the hub device 1305 without going through 1320 and 1330.

Figure 14:
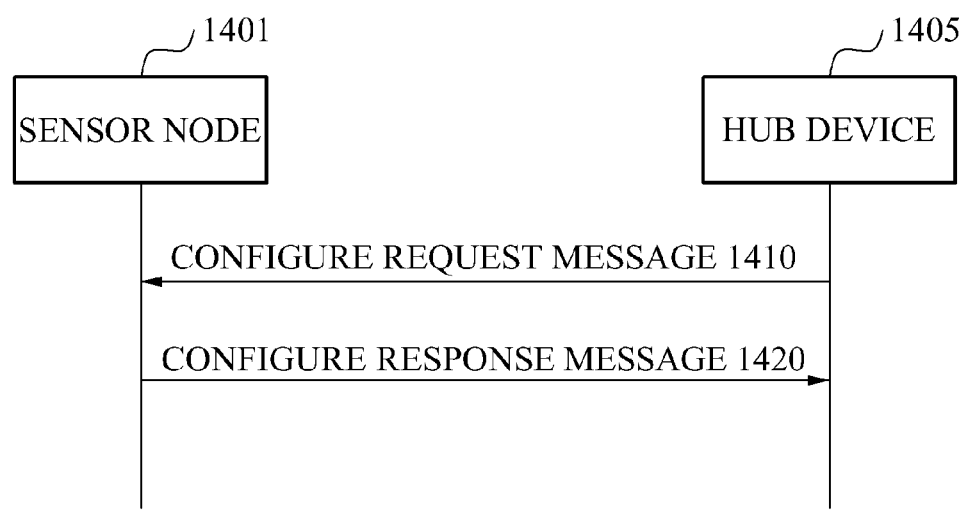
FIG. 14 is a flowchart illustrating an example in which a hub device performs a configure procedure with a sensor node.

FIG. 14 illustrates an example in which a hub device performs a configure procedure with a sensor node.

Referring to FIG. 14, in 1410, in response to determining to change an operation parameter or a protocol of a connected sensor node 1401, for example, a MAC protocol used in a MAC period by the sensor node 1401, a hub device 1405 transmits a configure request message to the sensor node 1401. The desire to change may be caused by various factors, for example, a network environment, and the like. The configure request message may inform the sensor node 1401 about that request to change the MAC protocol and the operation parameter based on a change in a communication environment.

In 1420, the sensor node 1401 stores information indicating whether to accept a requirement in a configure request message, and transmits the configure response message to the hub device 1405.

Figure 15:
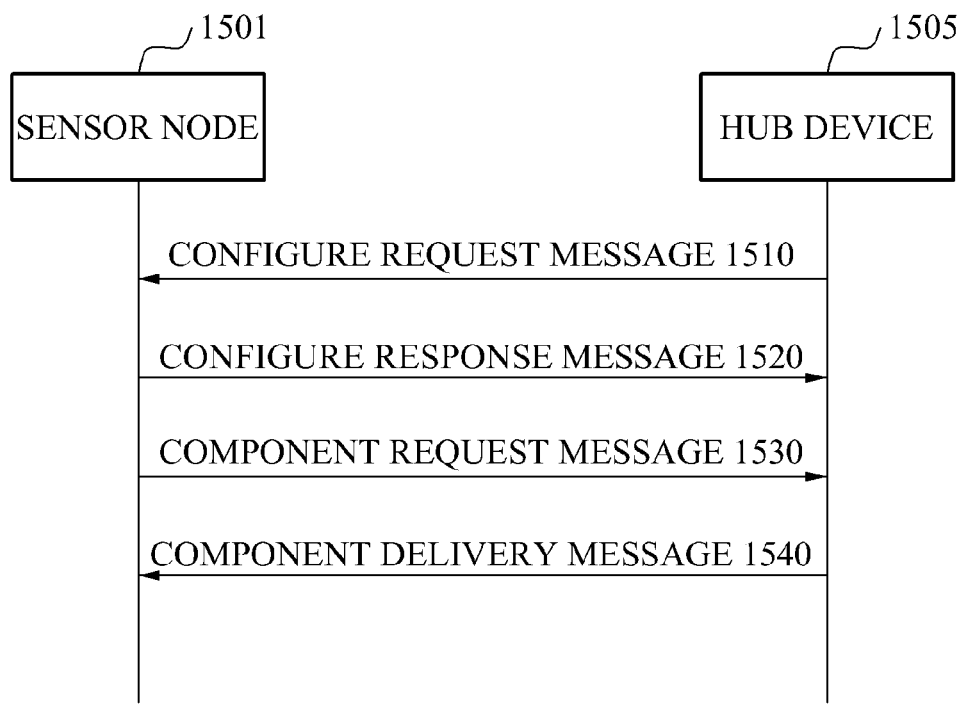
FIG. 15 is a flowchart illustrating an example in which a sensor node uses an additional component during a configure procedure with a hub device.

FIG. 15 illustrates an example in which a sensor node uses an additional component in a configure procedure with a hub device. In this example, the hub device may have a dynamic protocol reconfigure function and a relay function.

In 1510, in response to determining to change an operation protocol or a protocol of a connected sensor node 1501, for example, a MAC protocol used in a MAC period by the sensor node 1501, a hub device 1505 transmits a configure request message to the sensor node 1501.

In 1520, when the sensor node 1501 intends to accept a request in response to the configure request message, the sensor node 1501 transmits a configure response message to the hub device 1505.

In this example, the sensor node 1501 intends to accept the request, however, does not include a requested protocol. Accordingly, in 1530 the sensor node 1501 transmits a component request message to the hub device 1505.

If the hub device 1505 includes the component requested in the component request message, the hub device 1505 indicates a request acceptance and may transmit an ELF file of the component to the sensor node 1501 using a component delivery message in 1540. If there is data to be further transmitted, the hub device 1505 may indicate a pending data field of the component delivery message and thereby transmit the component delivery message to the sensor node 1501.

As another example, if the hub device 1505 does not have the component, the hub device 1505 may request an external device for the component. Upon receipt of the component from an external device, the hub device 1505 may transmit the requested component to the sensor node using the component delivery message 1540.

Figure 16:
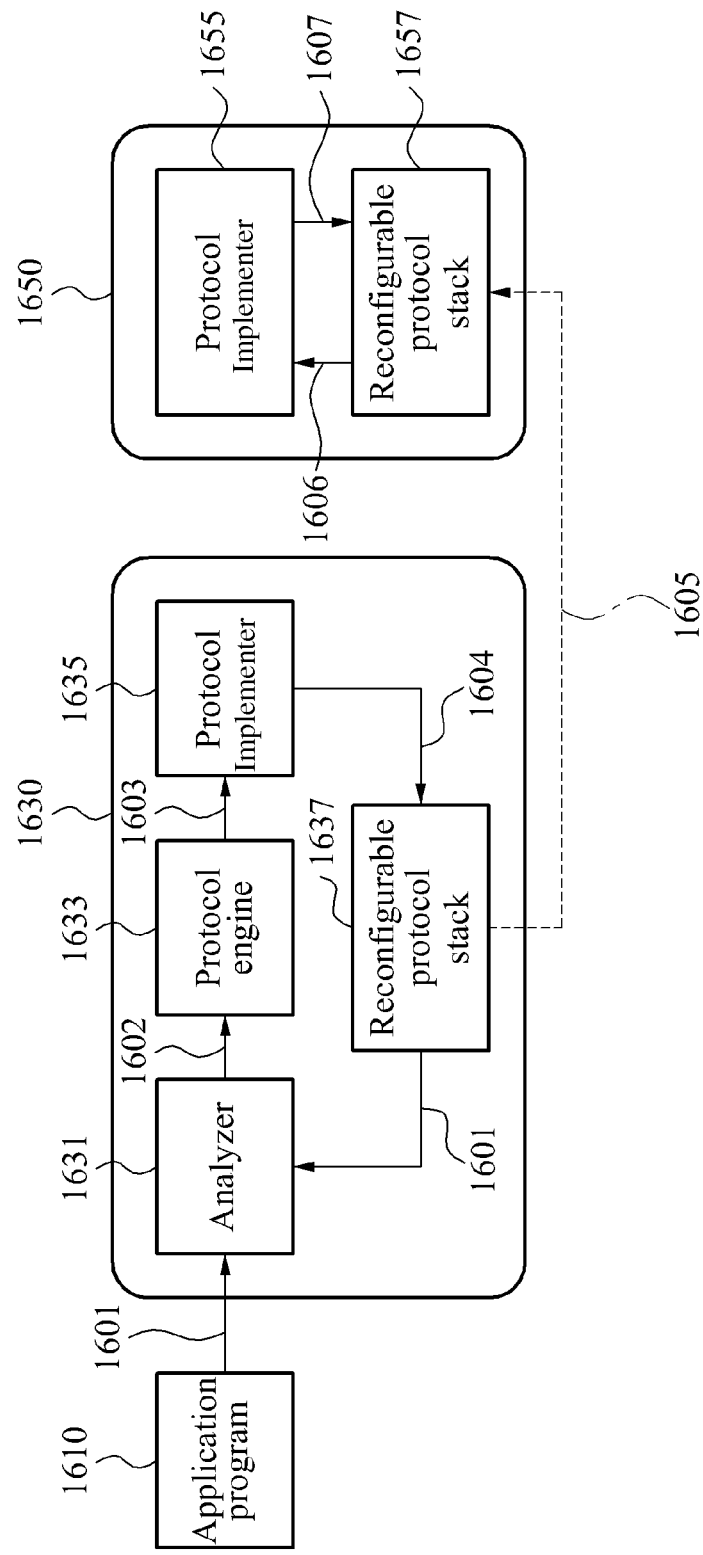
FIG. 16 is a diagram illustrating an example of an operation between a sensor node and a hub device having a dynamic protocol reconfigure function.

FIG. 16 illustrates an example of an operation between a sensor node and a hub device having a dynamic protocol reconfigure function.

Referring to FIG. 16, in 1601, an analyzer 1631 of the hub device 1630 may obtain an application program from an application program 1610. Alternatively, the analyzer 1631 may obtain requirement information of sensor nodes from the sensor nodes connected to the hub device 1630 and system information from a protocol layer. The analyzer 1631 may also obtain network information from a reconfigurable protocol stack 1637. For example, the application program 1610 may be installed in the hub device 1630, or an application program executed in the sensor node 1650.

In 1602, the analyzer 1631 may analyze the obtained information and provide the analysis result and obtained information to a protocol engine 1633. In this example, the protocol engine 1633 may determine protocol configure information based on the analysis result of the analyzer 1631. The protocol configure information may include a reconfigured protocol for the application program 1610 and a system parameter for the reconfigured protocol.

In 1603, the protocol engine 1633 may provide the protocol configure information to a protocol implementer 1635. To implement the reconfigured protocol based on the protocol configure information, the protocol implementer 1635 may determine a connection relationship between a plurality of components stored in the reconfigurable protocol stack 1637. For example, the reconfigurable protocol stack 1637 may maintain a memory in which a stack of the plurality of components is stored.

In 1604, the protocol implementer 1635 may transmit information associated with the connection relationship between the plurality of components to the reconfigurable protocol stack 1637. The reconfigurable protocol stack 1637 may connect the plurality of components using the corresponding information. Accordingly, the reconfigured protocol may be implemented.

In 1605, the reconfigurable protocol stack 1637 may transmit, to the sensor node 1650 connected to the hub device 1630, information used to implement the reconfigured protocol for the application program.

In 1606, a reconfigurable protocol stack 1657 of the sensor node 1650 which is a target device may receive information transmitted from the reconfigurable protocol stack 1637 of the hub device 1630. For example, the information may include information used to implement the reconfigured protocol for the application program and may transfer the received information to a protocol implementer 1655. In this example, the protocol implementer 1655 may determine a connection relationship between the plurality of components based on the transferred information.

In 1607, the protocol implementer 1655 may inform the reconfigurable protocol stack 1657 about information associated with the connection relationship. In this example, the reconfigurable protocol stack 1657 enables the reconfigurable protocol to be implemented in the sensor node 1650 by connecting at least one component used to implement the reconfigured protocol among the plurality of components based on information associated with the connection relationship.

According to various aspects, a dynamic protocol may be reconfigured in a network including at least one sensor node and at least one hub device. Accordingly, it is possible to provide synchronize different protocols of a hub device and at least one sensor node in real time using a super frame.

According to various aspects, a portable node may provide a QoS with respect to a plurality of sensor application programs.

According to various aspects, to reconfigure a dynamic protocol, it is possible to provide backward compatibility by enabling communication with a system in which a dynamic protocol reconfigure function is not installed, through a message exchange based on a super frame.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television to (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication system using a super frame to reconfigure a dynamic protocol in a network comprising at least one sensor node and a hub device, the communication system comprising:

the at least one sensor node and the hub device that communicate via the super frame,
wherein the super frame comprises:
a beacon period in which a beacon message is transferred to the at least one sensor node, the beacon message comprising information about an access period protocol to be used during an access period and information about a media access control (MAC) protocol to be used during a MAC period;
the access period in which the at least one sensor node requests access to the hub device based on the access period protocol; and
the at least one MAC period in which data is received from the at least one sensor node or is transmitted to the at least one sensor node based on the MAC protocol.

2. The communication system of claim 1, wherein the super frame further comprises:
a sleep period during which the at least one sensor node and the hub device suspend communication.

3. The communication system of claim 1, wherein the at least one MAC period comprises a plurality of MAC periods that are individually assigned to each of a plurality of sensor nodes, respectively.

4. The communication system of claim 1, wherein the information about the access period protocol comprises at least one of a field indicating an identifier (ID) of the access period protocol, a field indicating a length of the access period, and a field indicating a common parameter value of the access period protocol.

5. The communication system of claim 1, wherein the information about the MAC protocol comprises at least one of a field indicating the number of MAC protocols used in the at least one MAC period, a field indicating an ID of each MAC protocol used in the at least one MAC period, a field in which an amount of time used by each MAC period is sequentially sorted, and a field indicating information about common parameters used by the at least one MAC protocol.

6. The communication system of claim 1, wherein the beacon message further comprises a field indicating whether the hub device supports a reconfigure function of the dynamic protocol and a field indicating whether the hub device comprises a function of transferring a component request of the at least one sensor node to an external device.

7. The communication system of claim 1, wherein:
the at least one sensor node and the hub device exchange a control message to reconfigure the dynamic protocol during the access period, and
the control message comprises a type field indicating a type of the control message and a payload field corresponding to the type of the control message.

8. The communication system of claim 7, wherein:
the control message is a join request message used when the at least one sensor node requests access to the hub device, and
the payload field of the join request message comprises at least one of information indicating whether the at least one sensor node supports a reconfigure function of the dynamic protocol, information about an ID of each of at least one MAC protocol maintained by the at least one sensor node for reconfiguration of the dynamic protocol, and information about a quality of service (QoS) requirement of an application program requiring reconfiguration of the protocol.

9. The communication system of claim 7, wherein:
the control message is a join response message informing the at least one sensor node about a determination of the hub device with respect to a join request message, and
the payload field of the join response message comprises at least one of information indicating whether to allow the at least one sensor node to access the hub device, information about an ID of a MAC protocol used when the access is allowed, and information about a parameter setting value of the MAC protocol.

10. The communication system of claim 7, wherein:
the control message is a configure request message informing the at least one sensor node about a change in operation information, and
the payload field of the configure request message comprises at least one of information indicating whether to maintain access to the hub device, information associated with an ID of a MAC protocol used if the current access is maintained, and information associated with a parameter setting value of the MAC protocol.

11. The communication system of claim 7, wherein:
the control message is a component request message requesting a component to be used to reconfigure the dynamic protocol, and
the payload field of the component request message comprises at least one of information associated with an ID of a MAC protocol used by the at least one sensor node or the hub device, and information associated with an ID of a MAC protocol maintained by the at least one sensor node or the hub device.

12. The communication system of claim 7, wherein:
the control message is a component delivery message comprising information about a component used to reconfigure the dynamic protocol, and
a payload field of the component delivery message comprises at least one of information associated with the component and pending data information indicating whether subsequent information is present.

13. A method of a sensor node to reconfigure a dynamic protocol in a network comprising at least one sensor node and at least one hub device, the method comprising:
receiving a beacon message comprising information about an access period protocol to be used during an access period and information about a media access control (MAC) protocol to be used during a MAC period;
transmitting a join request message to a hub device based on the access period protocol, the join request message comprising a request by the at least one sensor node to access the hub device;
receiving a join response message indicating whether the hub device accepts the join request message; and
receiving or transmitting data according to the MAC protocol, in response to the hub device allowing the at least one sensor node to have access.

14. The method of claim 13, further comprising:
determining whether the sensor node maintains the MAC protocol based on the join response message.

15. The method of claim 13, further comprising:
transmitting, to the hub device, a message requesting a component used to configure the MAC protocol.

16. The method of claim 13, further comprising:
transmitting a notification message indicating whether the sensor node accepts the join response message using the access period protocol, in response to receiving the join response message from the hub device.

17. A method of a hub device to reconfigure a dynamic protocol in a network comprising at least one sensor node and a hub device, the method comprising:
transmitting, to the at least one sensor node, a beacon message comprising information about an access period protocol to be used during an access period and information about a media access control (MAC) protocol to be used during a MAC period;

receiving a join request message based on the access period protocol from the at least one sensor node, the join request message comprising a request for the at least one sensor node to access the hub device;

transmitting a join response message to the at least one sensor node based on the access period protocol, the join response message indicating whether the join request message is accepted; and receiving or transmitting data according to the MAC protocol, in response to the hub device allowing the at least one sensor node to access the hub device.

18. The method of claim 17, further comprising:
determining whether the at least one sensor node maintains a protocol reconfigure function based on the join request message; and
determining operation information based on information included in the join request message, based on the determination result.

19. The method of claim 18, further comprising:
transmitting, to the at least one sensor node, a configure request message informing of a change of the MAC protocol and an operation parameter.

20. The method of claim 17, further comprising:
receiving, from the at least one sensor node, a message requesting a component used by the at least one hub device to configure the MAC protocol; and
transmitting a component request message to an external apparatus depending on whether the component is included.

21. The method of claim 20, further comprising:
transmitting, to the at least one sensor node, a component delivery message comprising information associated with the component.

22. The method of claim 17, further comprising:
receiving a notification message indicating whether the at least one sensor node accepts the join response message, using the access period protocol.

* * * * *